United States Patent
Azechi et al.

(10) Patent No.: US 8,405,034 B2
(45) Date of Patent: Mar. 26, 2013

(54) SCINTILLATOR FOR NEUTRON DETECTION AND NEUTRON MEASUREMENT DEVICE

(75) Inventors: Hiroshi Azechi, Suita (JP); Nobuhiko Sarukura, Suita (JP); Yasunobu Arikawa, Suita (JP); Mitsuo Nakai, Suita (JP); Hirofumi Kan, Hamamatsu (JP); Takahiro Murata, Kumamoto (JP); Toshihisa Suyama, Tokyo (JP); Shigeru Fujino, Fukuoka (JP); Yoshiyuki Usuki, Tsukuba (JP); Hideki Yoshida, Nagasaki (JP); Akira Yoshikawa, Sendai (JP)

(73) Assignees: Osaka University, Suita-shi, Osaka (JP); TOKAI UNIVERSITY Educational System, Tokyo (JP)

( * ) Notice: Subject to any disclaimer, the term of this patent is extended or adjusted under 35 U.S.C. 154(b) by 0 days.

(21) Appl. No.: 13/266,189

(22) PCT Filed: Apr. 27, 2010

(86) PCT No.: PCT/JP2010/057499
§ 371 (c)(1),
(2), (4) Date: Jan. 4, 2012

(87) PCT Pub. No.: WO2010/126062
PCT Pub. Date: Nov. 4, 2010

(65) Prior Publication Data
US 2012/0091351 A1    Apr. 19, 2012

(30) Foreign Application Priority Data
Apr. 30, 2009  (JP) ................ P2009-111312

(51) Int. Cl.
*G01T 3/06*   (2006.01)
(52) U.S. Cl. .............. 250/366; 250/361 R; 250/368
(58) Field of Classification Search ............ 250/366
See application file for complete search history.

(56) References Cited

U.S. PATENT DOCUMENTS

| 4,916,320 A | * | 4/1990 | Wunderly et al. | ......... 250/483.1 |
| 4,931,649 A | * | 6/1990 | Czirr et al. | ............... 250/390.07 |
| 5,393,981 A | * | 2/1995 | Szabo et al. | .................. 250/367 |

FOREIGN PATENT DOCUMENTS

| JP | 2002-221578 | 8/2002 |
| JP | 2005-075916 | 3/2005 |
| JP | 2005-200462 | 7/2005 |
| JP | 2007-045869 | 2/2007 |
| WO | WO 2009/119378 | 10/2009 |

OTHER PUBLICATIONS

Azechi Hiroshi; "Concept of Laser Fusion," Journal of Plasma and Fusion Research, vol. 81, Suppl., pp. 2-10, (2005).
E. J. Fairley et al., "Neutron Scintillating Glasses Part III Pulse Decay Time Measurements at Room Temperature," Nuclear Instruments and Methods, vol. 150, pp. 159-163, (1978).

* cited by examiner

*Primary Examiner* — Marcus Taningco
(74) *Attorney, Agent, or Firm* — Drinker Biddle & Reath LLP (57) ABSTRACT

A neutron measurement apparatus 1A includes a neutron detection unit 10, a photodetection unit 20 that detects scintillation light emitted from the neutron detection unit 10, a light guide optical system 15 that guides the scintillation light from the neutron detection unit 10 to the photodetection unit 20, and a shielding member 30 which is located between the neutron detection unit 10 and the photodetection unit 20 for shielding radiation passing in a direction toward the photodetection unit 20. Further, a scintillator formed of a lithium glass material in which $PrF_3$ is doped to a glass material $20Al(PO_3)_3$-$80LiF$ is used as a neutron detection scintillator composing the neutron detection unit 10. Thereby, the neutron detection scintillator and the neutron measurement apparatus which are capable of suitably performing neutron measurement such as measurement of scattered neutrons from an implosion plasma can be realized.

7 Claims, 11 Drawing Sheets

SCINTILLATOR FOR NEUTRON DETECTION AND NEUTRON MEASUREMENT DEVICE

TECHNICAL FIELD

The present invention relates to a scintillator used for neutron detection and a neutron measurement apparatus using the scintillator.

BACKGROUND ART

It is known that, in laser fusion, a nuclear fusion burning rate that is an important indicator of its nuclear fusion phenomenon is heavily dependent on a fuel areal density $\rho R$ (plasma density×plasma radius, g/cm$^2$) in an implosion plasma. Therefore, the emphasis is on measurement and evaluation of a fuel areal density $\rho R$ in monitoring and controlling of a nuclear fusion phenomenon (for example, refer to Non Patent Document 1).

One of the most important development subjects is to achieve a high fuel areal density in the realization of laser nuclear fusion. For example, a fuel areal density of approximately $\rho R > 3$ g/cm$^2$ is required in an implosion plasma in which ignition-and-burn is assumed.

CITATION LIST

Non Patent Literature

Non Patent Document 1: AZECHI Hiroshi, "Concept of Laser Fusion," Journal of Plasma and Fusion Research, Vol. 81 Suppl., pp. 2-10(2005)

Non Patent Document 2: E. J. Fairley and A. R. Spowart, "Neutron Scintillating Glasses Part III Pulse Decay Time Measurements at Room Temperature," Nucl. Instr. and Meth., Vol. 150, pp. 159-163 (1978)

SUMMARY OF INVENTION

Technical Problem

As a method for measuring a fuel areal density $\rho R$ in an implosion plasma described above, conventionally, a knock-on method for measuring knock-on deuterium, a secondary reaction method for measuring DT neutrons, and the like have been developed. However, in these methods, for example, the upper limit as a $\rho R$ value which is measurable is approximately 150 mg/cm$^2$ in a knock-on method, and the upper limit of the same is approximately 30 mg/cm$^2$ in a second-order reaction method, and these methods cannot be applied to the measurement of a fuel areal density higher than those upper limits.

On the other hand, a measurement method using scattered neutrons is proposed as a method for measuring a fuel areal density $\rho R$. In this method, a fuel areal density is measured with a rate of producing scattered neutrons $n_S$ that primary neutrons $n_0$ produced in the center of an implosion plasma elastically collide against deuterium ions D in a nuclear fusion fuel to be emitted. However, in such a method, the quantity of scattered neutrons is predominantly less than the quantity of primary neutrons, and its energy as well is lower, which brings about the problem that it is difficult to separately measure scattered neutrons reaching later than primary neutrons and X-rays for a neutron detector.

The present invention has been made in order to solve the above-described problem, and it is an object of the present invention to provide a neutron detection scintillator and a neutron measurement apparatus which are capable of suitably performing neutron measurement such as measurement of scattered neutrons from an implosion plasma.

Solution to Problem

In order to achieve such an object, a neutron detection scintillator according to the present invention is a scintillator which emits scintillation light in response to incidence of neutrons, the scintillator is formed of a lithium glass material which is a glass material 20Al(PO$_3$)$_3$-80LiF doped with PrF$_3$ at a predetermined doping amount.

In the above-described neutron detection scintillator, Pr-doped lithium containing glass is used as a scintillator for neutron detection. In the lithium glass scintillator that detects neutrons by utilizing a neutron capture reaction by $^6$Li, when the scintillator is used for measurement of neutrons from an implosion plasma, a resonant peak of a reaction cross section with $^6$Li is approximately matched with the energy of backscattered neutrons, for the scattered neutrons $n_S$ whose energy is lower than that of primary neutrons $n_0$. Therefore, it is possible to selectively and highly efficiently detect scattered neutrons corresponding to a fuel areal density $\rho R$ among neutrons from the implosion plasma.

Moreover, with respect to the Pr-doped lithium containing glass material composing the scintillator, in detail, a lithium glass material expressed by the following formula;

$$20Al(PO_3)_3\text{-}80LiF\text{-}nPrF_3$$

with a doping amount of PrF$_3$ being n % (n>0) in mol %, is used. This newly developed scintillator is provided with fast responsiveness faster than that of a conventional neutron detection scintillator (for example, refer to Non Patent Document 2). Therefore, with such a scintillator being used for neutron detection, it is possible to measure scattered neutrons separately from primary neutrons and X-rays. Further, such a fast response is effective not only for a case where the scintillator is used for measurement of scattered neutrons from an implosion plasma as described above, but also generally effective for measurement of neutrons.

The neutron measurement apparatus according to the present invention includes (1) a neutron detection unit including the above-described neutron detection scintillator, (2) a photodetection unit detecting scintillation light emitted from the neutron detection unit in response to incidence of neutrons of measurement objects, and (3) a light guide optical system guiding the scintillation light from the neutron detection unit to the photodetection unit.

In the above-described measurement apparatus, a scintillator formed of a lithium glass material of the composition formula 20Al(PO$_3$)$_3$-80LiF-nPrF$_3$ is used as a scintillator in the neutron detection unit that detects the neutrons of measurement objects. With such a configuration, when the scintillator is used for measurement of neutrons from an implosion plasma, it is possible to selectively and highly efficiently detect scattered neutrons among the neutrons from the implosion plasma. Further, it is possible to measure scattered neutrons separately from primary neutrons and X-rays due to the fast responsiveness of the scintillator. Thereby, a neutron measurement apparatus which is capable of suitably performing neutron measurement such as measurement of scattered neutrons from an implosion plasma can be realized.

Advantageous Effects of Invention

In accordance with the neutron detection scintillator and the neutron measurement apparatus of the present invention, a Pr-doped lithium containing glass material expressed by the composition formula $20Al(PO_3)_3$-$80LiF$-$nPrF_3$ is used as a scintillator used for neutron detection, thereby it is possible to selectively and highly efficiently detect scattered neutrons among neutrons from an implosion plasma, and further it is possible to measure the scattered neutrons separately from primary neutrons and X-rays due to its fast response.

DESCRIPTION OF EMBODIMENTS

Hereinafter, preferred embodiments of a neutron detection scintillator and a neutron measurement apparatus according to the present invention will be described in detail with reference to the accompanying drawings. In addition, in the description of the drawings, the same components are denoted by the same reference symbols, and overlapping description will be omitted. Further, the dimensional ratios in the drawings are not always equal to those in the description.

Figure 1:
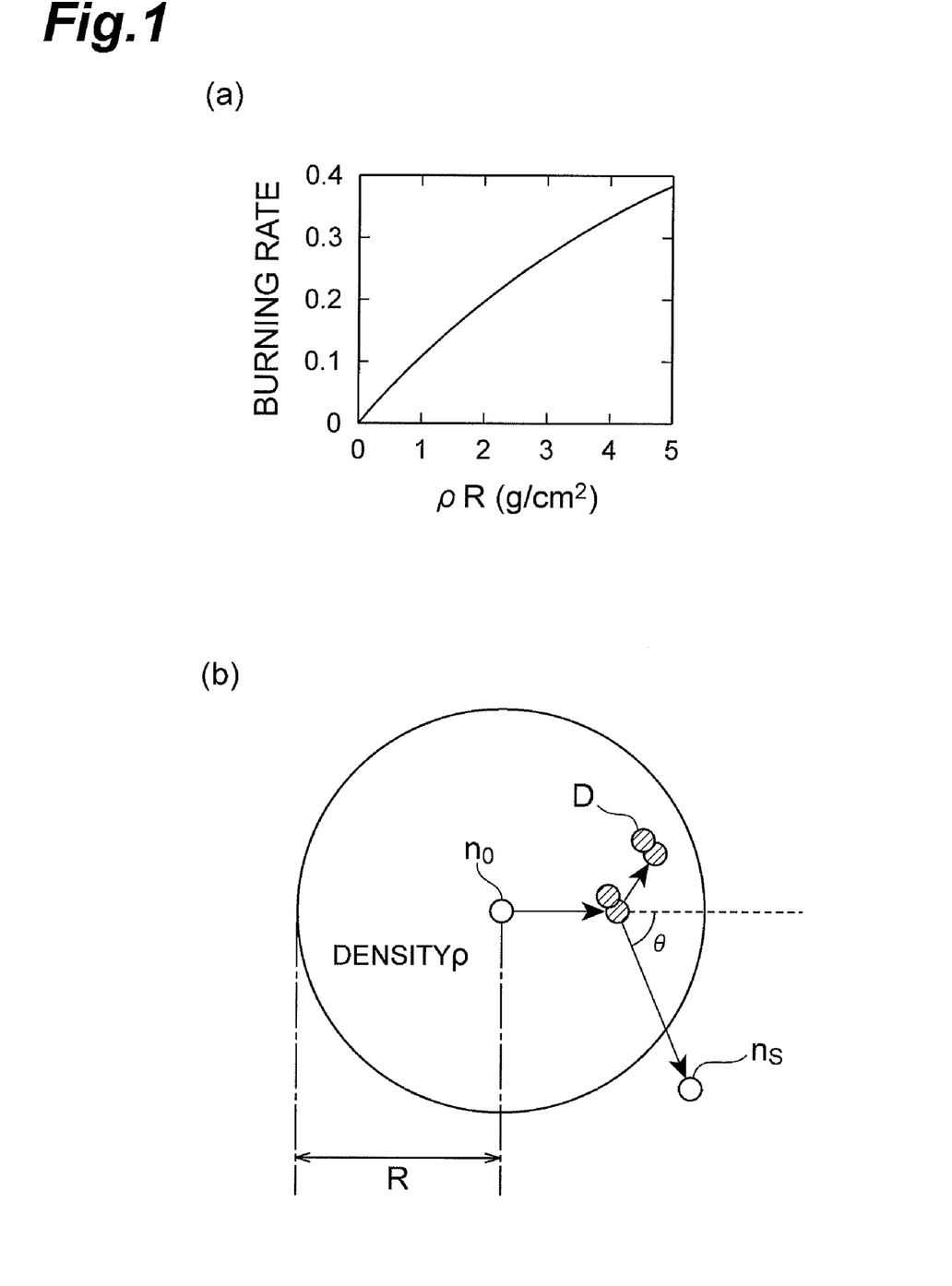
FIG. 1 is a figure including diagrams showing a fuel areal density $\rho R$ in an implosion plasma.

First, a fuel areal density $\rho R$ in an implosion plasma in laser fusion and scattered neutrons $n_S$ emitted from the implosion plasma will be described. Here, FIG. 1 is a figure including diagrams showing the fuel areal density $\rho R$ in an implosion plasma. As shown in (b) in FIG. 1, in the fuel areal density $\rho R$ ($g/cm^2$), $\rho$ is a density of the implosion plasma, and R is a radius of the implosion plasma. Further, hereinafter, among neutrons n emitted from the implosion plasma, primary neutrons are represented as $n_0$, and scattered neutrons are represented as $n_S$.

(a) in FIG. 1 is a graph showing a relationship between a nuclear fusion burning rate and a fuel areal density $\rho R$ assuming that a burning temperature is 20 keV. As shown in this graph, a burning rate in laser nuclear fusion heavily depends on the fuel areal density $\rho R$ of the implosion plasma. Therefore, the emphasis is on evaluation of a $\rho R$ value in monitoring and controlling of a nuclear fusion phenomenon.

As a method for evaluating the fuel areal density $\rho R$ in the implosion plasma, the measurement of the scattered neutrons $n_S$ is under investigation. As shown in (b) in FIG. 1, the scattered neutron $n_S$ is a neutron emitted by scattering;

that the primary neutron $n_0$ produced in the center of the implosion plasma elastically collides with the deuterium ion D in the fuel. Further, a probability of collision of primary neutrons $n_0$ against the deuterium ions D in the implosion plasma, and a probability of generating the scattered neutrons $n_S$ due to the collision are proportional to a $\rho R$ value. Therefore, it is possible to evaluate the fuel areal density $\rho R$ by measuring scattered neutrons emitted from the implosion plasma.

Figure 2:
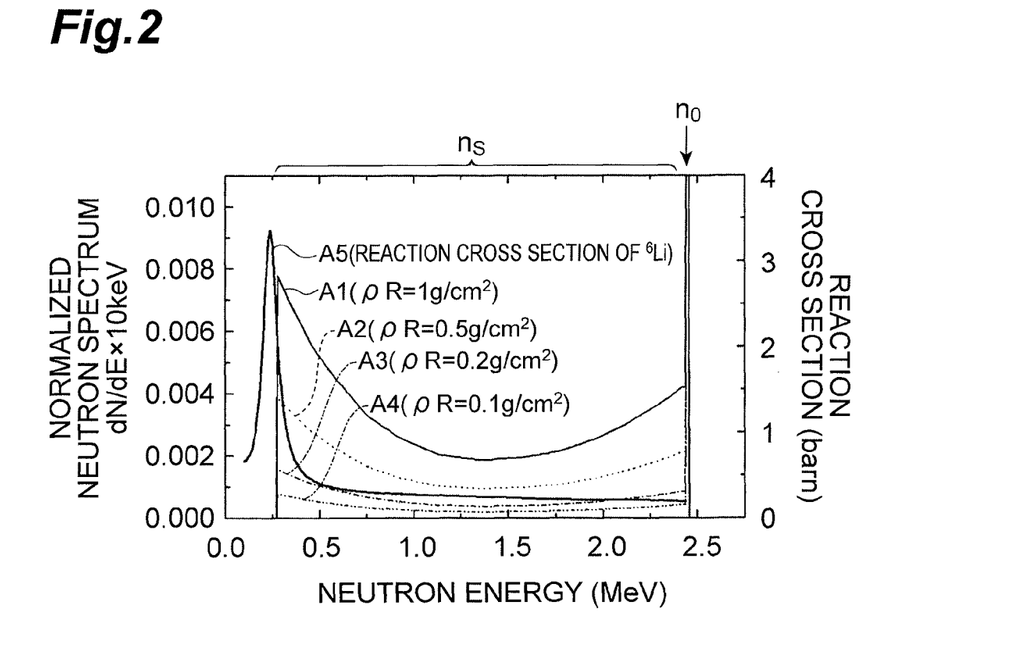
FIG. 2 is a graph showing energy spectra of primary neutrons $n_0$ and scattered neutrons $n_S$ emitted from an implosion plasma.

FIG. 2 is a graph showing energy spectra of the primary neutrons $n_0$ and the scattered neutrons $n_S$ emitted from the implosion plasma. In this graph, the horizontal axis shows the neutron energy (MeV), and the vertical axis shows the normalized neutron spectrum (dN/dE×10 keV, graphs A1 to A4), or the reaction cross section (barn, graph A5).

The graph A1 shows a neutron spectrum emitted from the implosion plasma when a fuel areal density is $\rho R=1$ $g/cm^2$, the graph A2 shows a neutron spectrum when $\rho R=0.5$ $g/cm^2$, the graph A3 shows a neutron spectrum when $\rho R=0.2$ $g/cm^2$, and the graph A4 shows a neutron spectrum when $\rho R=0.1$ $g/cm^2$. As is clear from these graphs A1 to A4, a scattering intensity of neutrons changes in proportion to a fuel areal density $\rho R$ value. Further, an emission intensity of the scattered neutrons $n_S$ is much lower than an emission intensity of the primary neutrons $n_0$.

In the above-described nuclear fusion phenomenon, the energy of the primary neutrons $n_0$ generated in the implosion plasma is $E_0=2.45$ MeV. On the other hand, the energy of the scattered neutrons $n_S$ generated by elastic scattering with the deuterium ions D changes depending on its scattering angle θ (refer to (b) in FIG. 1), and is $E_S=0.272$ MeV in a case of back-scattering with the lowest energy. Further, referring to the neutron spectra shown in FIG. 2, the intensities of the scattered neutrons are increased in backscattering at lower energy.

A lithium glass scintillator may be suitably used for neutron detection for such scattered neutrons from an implosion plasma. The scintillator using lithium containing glass detects neutrons by utilizing the following neutron capture reaction by $^6Li$.

As shown by this reaction formula, after $^6Li$ captures a neutron n, $^6Li$ exothermally emits nuclear fission product particles T and α, to excite the scintillator. By utilizing such an exothermal reaction, it is possible to obtain a sufficient light-emission amount in the scintillator even from scattered neutrons at lower energy.

Further, the graph A5 in FIG. 2 shows the energy dependence of a reaction cross section of a neutron capture reaction by $^6Li$ described above. As shown in the graph A5, a resonant peak of the reaction cross section with $^6Li$ is approximately matched with the energy of back-scattered neutrons. Therefore, by utilizing such a reaction to detect neutrons, it is possible to selectively and highly efficiently detect scattered neutrons corresponding to the fuel areal density $\rho R$ among the neutrons from the implosion plasma.

In the neutron detection scintillator according to the present invention, a lithium glass material is used as a scintillator material on the basis of such knowledge. Moreover, as a result of investigating its specific composition in the lithium glass material, the scintillator with fast responsiveness as compared with a conventional one is successfully developed, to achieve the present invention.

Figure 3:
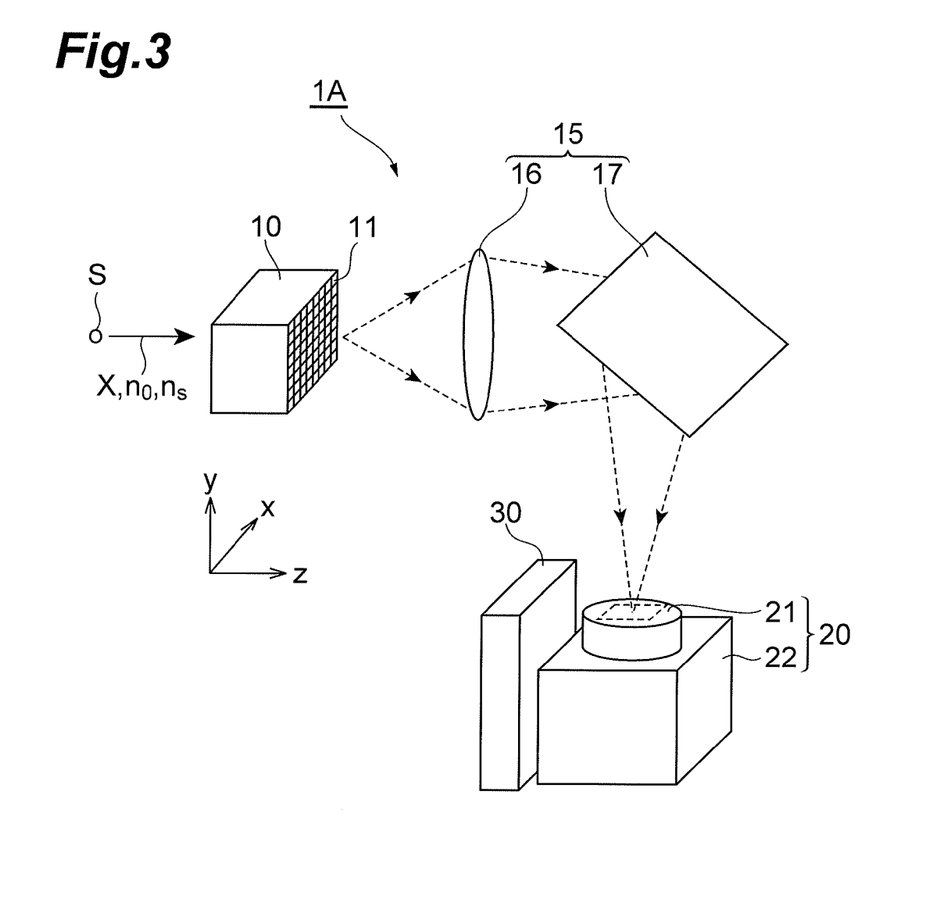
FIG. 3 is a diagram schematically showing a configuration of an embodiment of a neutron measurement apparatus.

FIG. 3 is a diagram schematically showing a configuration of an embodiment of a neutron measurement apparatus using the neutron detection scintillator according to the present invention. Here, as an example, with the case where scattered neutrons $n_S$ emitted from an implosion plasma S in laser fusion are measurement objects as described above, the configuration of the neutron measurement apparatus will be described. In the configuration of FIG. 3, the implosion plasma S has a diameter of, for example, approximately 30 μm. Further, a distance from the implosion plasma S to a neutron detection unit 10 of a measurement apparatus 1A is set according to specific measurement conditions, and is, for example, approximately 30 cm.

The neutron measurement apparatus 1A according to the present embodiment includes the neutron detection unit 10, a light guide optical system 15, a photodetection unit 20, and a shielding member 30. In the measurement apparatus 1A shown in FIG. 3, the neutron detection unit 10 is configured by using a scintillator formed of Pr-doped lithium containing glass as a scintillator for neutron detection.

In detail, in the present embodiment, the scintillator formed of a lithium glass material is used for neutron detection, which is a glass material $20Al(PO_3)_3\text{-}80LiF$ doped with $PrF_3$, that is expressed by the following formula;

$$20Al(PO_3)_3\text{-}80LiF\text{-}nPrF_3$$

with a doping amount of $PrF_3$ being n % (n>0) in mol %. An emission wavelength band of scintillation light emitted from the scintillator is, for example, an ultraviolet wavelength band around a wavelength of 270 nm.

The neutron detection scintillator having the above-described composition has not only the advantage of neutron detection by the lithium glass scintillator as described above, but also the advantage of fast response, that is, the advantage that a decay time of scintillation light (a fluorescence lifetime) is much shorter than that of a conventional lithium glass scintillator for neutron detection.

Figure 4:
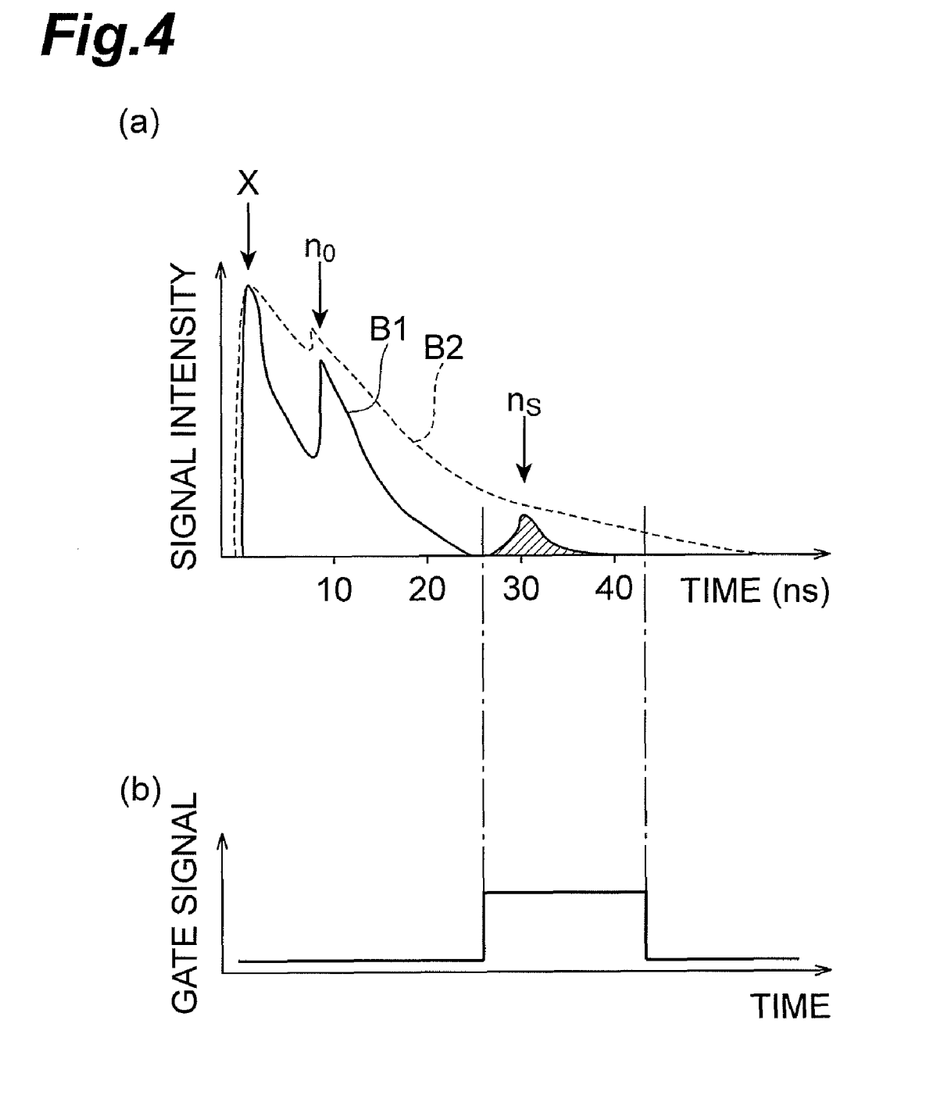
FIG. 4 is a figure including graphs schematically showing temporal waveforms which are obtained by detecting X-rays, primary neutrons $n_0$ and scattered neutrons $n_S$ emitted from an implosion plasma with a scintillator.

Here, the graph (a) in FIG. 4 schematically shows temporal waveforms (time changes in detection signal intensity) which are obtained by detecting X-rays, primary neutrons $n_0$, and scattered neutrons $n_S$ by the scintillator at a distance of 30 cm from the implosion plasma S. Further, in the graph (a) in FIG. 4, the graph B1 shows the detection signal waveform when the neutron detection scintillator $20Al(PO_3)_3\text{-}80LiF\text{-}nPrF_3$ with fast responsiveness is used, and the graph B2 shows the detection signal waveform when the conventional lithium glass scintillator is used.

In a case where radiation such as X-rays and neutrons emitted from the implosion plasma S is detected with the scintillator (refer to FIG. 3) disposed at a predetermined distance from the implosion plasma S, first, the X-rays reach the scintillator to be detected, next, the primary neutrons $n_0$ are detected, and the low-energy scattered neutrons $n_S$ are detected later than those. Looking at the graph B2 of the temporal waveform by the conventional scintillator under such a detecting condition, the scattered neutrons $n_S$ are incident into the scintillator before the scintillation light by the previously detected X-rays and primary neutrons $n_0$ are sufficiently attenuated, and therefore, it is impossible to measure the scattered neutrons $n_S$ separately from those.

On the other hand, in the graph B1 of the temporal waveform by the scintillator with fast response of the present invention, the scattered neutrons $n_S$ are detected after the scintillation light by the X-rays and primary neutrons $n_0$ are sufficiently attenuated. Thereby, it is possible to measure the scattered neutrons reaching later than those separately from the X-rays and the primary neutrons from the implosion plasma S due to a time of flight difference from the implosion plasma S to the neutron detection unit 10. Here, the fast response of the scintillator having the above-described composition will be described later in more detail along with specific data.

The neutron detection unit 10 shown in FIG. 3 uses a scintillator formed of the above-described glass material $20Al(PO_3)_3\text{-}80LiF\text{-}nPrF_3$ for neutron detection, and is configured as a scintillator array in which a plurality of scintillator cells 11 are two-dimensionally arrayed. Here, the x-axis, the y-axis, and the z-axis are set as shown in FIG. 3, the scintillator array 10 is configured such that the scintillator cells 11 of a shape along the z-axis direction as its longitudinal direction are used, and the scintillator cells 11 are arrayed in the x-axis direction and the y-axis direction so as to be a two-dimensional matrix form. Further, at this time, the scintillation light output from the scintillator array 10 is a two-dimensional optical image corresponding to the two-dimensional array structure of the cells 11 and a pattern of detecting neutrons in the array structure.

As a specific example of such a scintillator array 10, a configuration in which a size of the scintillator cell 11 per one channel (1ch) is set to 1 mm×1 mm×40 mm, and the cells 11 are arrayed into 40ch in the x-axis direction and 40ch in the y-axis direction, that is a total 40×40=1600ch, array structure may be used. In this case, the size of the outline of the scintillator array 10 of the neutron detection unit is 40 mm×40 mm×40 mm. Further, as the scintillator cells 11, for example, cells that a scintillator is cut out into long shapes and polished, and those are coated with a diffuse reflective surface material, may be used.

The two-dimensional optical image by the scintillation light emitted from the scintillator array 10 is guided to the photodetection unit 20 via the light guide optical system 15 having a condenser lens 16 and a reflecting mirror 17. The photodetection unit 20 shown in FIG. 3 includes an image intensifier (I. I.) 21 and a two-dimensional photodetector 22. The two-dimensional photodetector 22 is a photodetector configured to be able to detect a two-dimensional optical image from the scintillator array 10, and for example, an imaging device such as a CCD in which a plurality of detecting pixels are two-dimensionally arrayed may be used. Or, a photomultiplier tube (PMT) or the like may be used as a photodetector.

The image intensifier 21 is disposed at the front of the two-dimensional photodetector 22 (on the side of the neutron detection unit), and is optical image intensifier means that intensifies a two-dimensional optical image incident into the photodetector 22 from the scintillator array 10. Further, the image intensifier 21 preferably has a gate function of limiting a period for detecting a two-dimensional optical image. In this case, as an example of a gate signal used for a gate operation is that schematically shown in the graph (b) in FIG. 4, a gate period for which neutron detection is carried out is appropriately set, to be able to selectively measure only the scintillation light components due to the scattered neutrons $n_S$.

Further, in the measurement apparatus 1A of the present embodiment, the shielding member 30 is provided at a predetermined position between the scintillator array 10 and the photodetection unit 20, which is lateral to the photodetection unit 20 on the scintillator array 10 side in the configuration of FIG. 3. This shielding member 30 is shielding means that shields excess radiation such as X-rays and neutrons passing in a direction toward the photodetection unit 20. The shielding member 30 is configured by using a lead shield, for example.

The effects of the neutron detection scintillator and the neutron measurement apparatus according to the above-described embodiment will be described.

In the neutron detection unit 10 of the measurement apparatus 1A shown in FIG. 3, the Pr-doped lithium containing glass is used as a scintillator used for neutron detection. In the lithium glass scintillator that utilizes a neutron capture reaction by $^6$Li, for the scattered neutrons $n_S$ whose energy is lower than that of the primary neutrons $n_0$, a resonant peak of a reaction cross section with $^6$Li is approximately matched with the energy of back-scattered neutrons. Therefore, it is possible to selectively and highly efficiently detect the scattered neutrons $n_S$ corresponding to the fuel areal density $\rho R$ among the neutrons from the implosion plasma S.

Moreover, in the above-described embodiment, as a glass material composing the scintillator, a lithium glass material expressed by the following formula;

is used. This newly developed scintillator is provided with fast responsiveness faster than that of a conventional scintillator. Therefore, with such a scintillator being used for neutron detection, as shown in FIG. 4, it is possible to measure the scattered neutrons $n_S$ separately from the primary neutrons $n_0$ and X-rays.

With respect to a doping amount of $PrF_3$ in the glass composition in the above-described scintillator, a doping amount of $PrF_3$ for the glass material $20Al(PO_3)_3$-$80LiF$ is preferably not less than 1% and not more than 3% in mol % ($1\% \leq n\% \leq 3\%$) in view of the properties of the scintillator and the manufacturing conditions, and the like. Thereby, it is possible to suitably realize a neutron detection scintillator with fast response. Here, when a doping amount of $PrF_3$ is increased, the dissolution temperature for the glass material is increased, making it more difficult to manufacture glass.

In the neutron measurement apparatus 1A shown in FIG. 3, the measurement apparatus is configured with the neutron detection unit 10 including the above-described scintillator, the photodetection unit 20, and the light guide optical system 15. With such a configuration, when the measurement apparatus is used for measurement of neutrons from the implosion plasma S, it is possible to highly efficiently detect the scattered neutrons $n_S$ separately from the primary neutrons $n_0$ and X-rays. Thereby, the neutron measurement apparatus 1A which is capable of suitably performing neutron measurement such as measurement of the scattered neutrons $n_S$ from the implosion plasma S can be realized.

Further, in the measurement apparatus 1A, the shielding member 30 is provided, in addition to the light guide optical system 15, between the neutron detection unit 10 and the photodetection unit 20. Thereby, the generation of noise components due to the excess radiation such as X-rays and neutrons from the implosion plasma S being incident into the photodetection unit 20 to be detected is suppressed, which makes it possible to accurately perform the neutron measurement.

Further, in the measurement apparatus 1A shown in FIG. 3, the neutron detection unit 10 is configured by the scintillator array in which the plurality of scintillator cells 11 are two-dimensionally arrayed, and the photodetection unit 20 is configured by using the two-dimensional photodetector 22 configured to be able to detect a two-dimensional optical image of the scintillation light, so as to correspond to the scintillator array 10. With such a configuration, the number of detecting primary neutrons by the cells 11 per one channel is reduced, and it is possible to facilitate the detection of scattered neutrons due to a spatial separation effect between the primary neutrons and the scattered neutrons.

Figure 5:
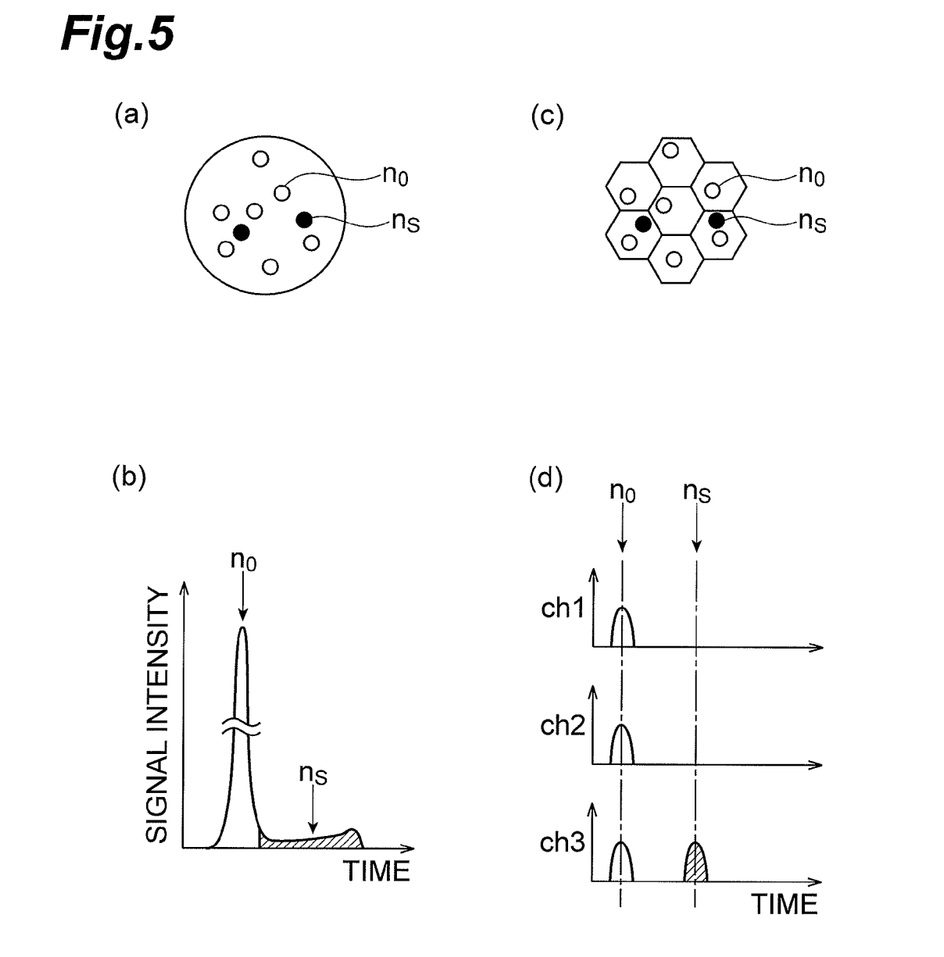
FIG. 5 is a figure including schematic views showing multi-channelizing of scintillator cells in a neutron detection unit.

FIG. 5 is a figure including schematic views showing multi-channelizing of scintillator cells in the neutron detection unit 10. In FIG. 5, (a) and (b) in FIG. 5 show the state of detecting neutrons by the scintillator cell of a single channel and the temporal waveform of detection signal obtained in that case. Further, (c) and (d) in FIG. 5 show the state of detecting neutrons by the scintillator cells of a plurality of channels and the temporal waveforms of detection signals obtained in that case.

As shown in (a) and (b) in FIG. 5, in the neutron detection unit with the single channel, the number of detecting primary neutrons $n_0$ detected in the detection channel is extremely large and therefore, it is difficult to measure the scattered neutrons $n_S$ with a small number of detections in view of an SN ratio or the like. On the other hand, in the neutron detection unit with the plurality of channels, it is possible to reduce the number of detecting primary neutrons per channel. In the example shown in (c) and (d) in FIG. 5, the number of detecting primary neutrons $n_0$ per channel is about one. On the other hand, it is clear that the number of detecting scattered neutrons $n_S$ is one or zero per channel, and further, it is easy to measure the scattered neutrons separately from the primary neutrons $n_0$.

In the measurement apparatus 1A shown in FIG. 3, the image intensifier 21 is provided at the front side of the two-dimensional photodetector 22 in the photodetection unit 20. With such a configuration, a two-dimensional optical image by scintillation light corresponding to a pattern of detecting neutrons in the neutron detection unit 10 is intensified, to be able to improve the accuracy of detection of the optical image by the two-dimensional photodetector 22. However, the image intensifier 21 as described above may not be provided when it is not needed such as a case where the intensity of scintillation light is sufficient.

Further, in the case where the image intensifier 21 is used in the photodetection unit 20 as described above, it is particularly preferable that the image intensifier 21 has a gate function of limiting a period for detecting a two-dimensional optical image. By utilizing such a gate function, it is possible to suitably execute selective detection of the scattered neutrons $n_S$ with respect to the primary neutrons $n_0$ and X-rays.

For example, as an example of the image intensifier 21, an image intensifier is taken into account which is composed of a photoelectric surface that converts a two-dimensional optical image by scintillation light into an electron image, an MCP that intensifies the electron image, and a phosphor screen that converts the intensified electron image into an optical image again to output the optical image to the photodetector 22. In this case, a voltage applied between the photoelectric surface and the MCP as a gate signal is used to control a state of gate-ON in which an optical image is intensified and a state of gate-OFF. In the state of gate-OFF, for example, a voltage applied is set so as to not let photoelectrons generated from the photoelectric surface reach the MCP, to make a state in which the optical image is not intensified and output.

The neutron detection scintillator used in the neutron measurement apparatus 1A described above will be further described along with specific data. In addition, hereinafter, the glass material $20Al(PO_3)_3$-$80LiF$ is abbreviated to APLF80, as needed. Further, the glass material which is doped with $PrF_3$ at n mol % is abbreviated to APLF80+nPr in the same way.

The scintillator formed of the glass material APLF80+nPr may, for example, be manufactured in a method for the following manufacturing example. First, the respective raw materials at a batch quantity of 80 g are prepared at a mixing ratio corresponding to the composition ratio described above. Then, those raw materials are melted at a melting temperature of 1100° C., for a melting time of one hour, and under the condition of nitrogen atmosphere in a glassy carbon crucible. Thereafter, the melted glass material is cooled down to around 400° C. in the furnace and taken out, and moreover, the glass material is subjected to annealing in the vicinity of a glass transition temperature, to produce the scintillator.

Figure 6:
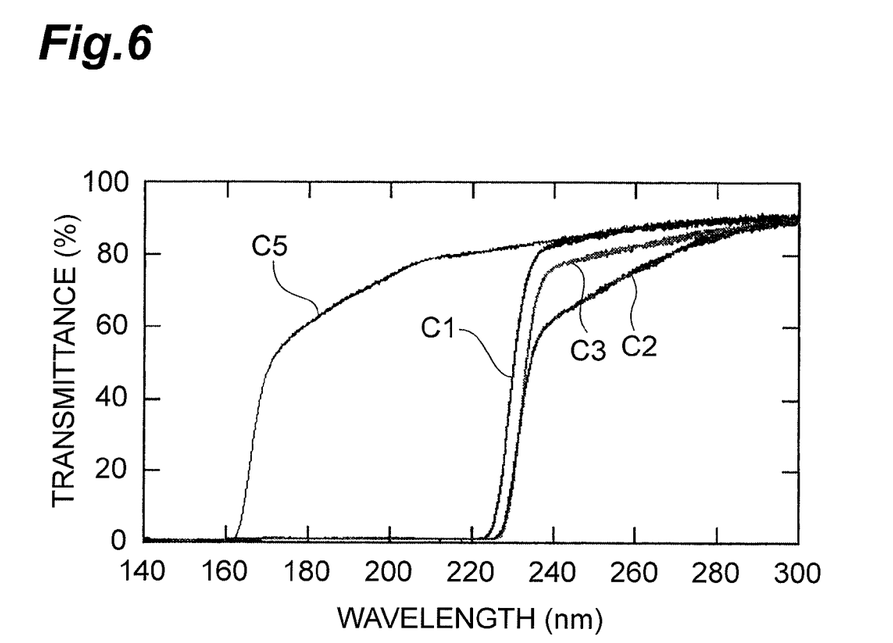
FIG. 6 is a graph showing wavelength dependencies of light transmittances through glass materials.

FIG. 6 is a graph showing wavelength dependencies of light transmittances through glass materials, the horizontal axis shows the wavelength (nm), and the vertical axis shows the light transmittance (%). Further, in FIG. 6, the graph C5 shows the light transmittance of a glass material $AP^7LF80$ in which $PrF_3$ is not doped, that is produced at a melting temperature of 800° C. As shown in this graph C5, the glass material APLF80 in which $PrF_3$ is not doped is a glass material with high transmittance up to the ultraviolet region. Further, this glass material consists largely of LiF (lithium fluoride), meanwhile, the glass material contains $Al(PO_3)_3$ (aluminum metaphosphate) to be highly water resistant, which results in a stable material. Here, $^7L$ denotes natural lithium, and $^6L$ denotes an isotopic enrichment lithium raw material.

Further, in FIG. 6, the graph C1 shows the light transmittance of $AP^6LF80+1Pr$ at a density of 2.63 g/cm$^3$ which is produced at a melting temperature of 800° C., the graph C2 shows the light transmittance of $AP^6LF80+1Pr$ at a density of 2.69 g/cm$^3$ which is produced at a melting temperature of 900° C., and the graph C3 shows the light transmittance of $AP^7LF80+1Pr$ which is produced at a melting temperature of 900° C. As shown on these graphs C1 to C3, it is clear that the light transmittances change by adding $PrF_3$ to the glass material APLF80.

Because such a lithium glass scintillator detects neutrons by utilizing a neutron capture reaction by $^6Li$, the detection sensitivity for neutrons is basically determined on the basis of a lithium density. For example, in a scintillator produced by the composition formula APLF80+3Pr, its lithium density is $1.7 \times 10^{22}$/cm$^3$. This density is equivalent to those of, for example, KG2 and GS20 (manufactured by Saint-Gobain K.K.) which are the conventional lithium glass scintillators.

Figure 7:
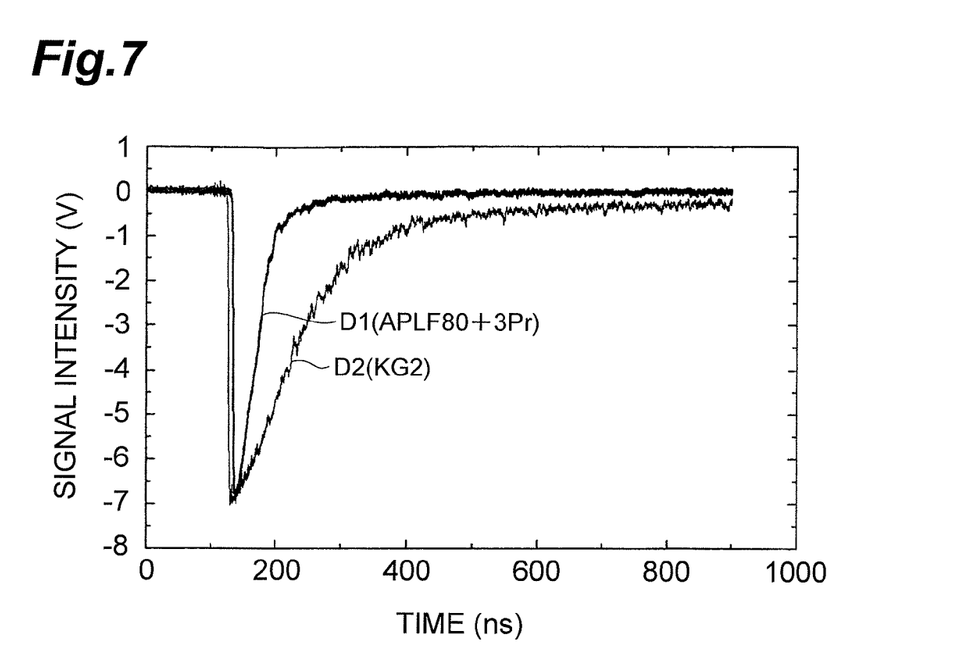
FIG. 7 is a graph showing temporal waveforms of detection signals obtained by X-ray detection.

FIG. 7 is a graph showing temporal waveforms of detection signals obtained by X-ray detection (X-ray excitation), the horizontal axis shows the time (ns), and the vertical axis shows the signal intensity (V). Here, in detail, the measurements of the detection signal waveforms were carried out by using X-rays emitted during a nuclear fusion shot. Further, in FIG. 7, the graph D1 shows the detection signal waveform when the APLF80+3Pr is used as a scintillator, and the graph D2 shows the detection signal waveform when the KG2 serving as a conventional scintillator is used.

In detail, the scintillator APLF80+3Pr or KG2 was rolled up with a Teflon (registered trademark) tape, and attached on the light-receiving surface of the photomultiplier tube (PMT), light shielding is applied to the entire area, and it was installed at a position of 1 m from a target chamber, to carry out the measurement. It was confirmed from the data that the background noise is sufficiently low. Further, the response of the photomultiplier tube is approximately 5 ns.

As shown in the graph of FIG. 7, on the graph D2 when the conventional KG2 is used as a scintillator, a decay time of the signal is 81 ns. On the other hand, in the graph D1 when the newly developed APLF80+3Pr is used, a decay time of the signal is 19 ns, which makes it clear that a response speed is improved in comparison with that of the conventional scintillator.

In addition, in the measurement data, an integrated signal intensity ratio of APLF80+3Pr:KG2 is approximately 1:3. Further, in the scintillator used for the measurements, the APLF80+3Pr and the KG2 are tenfold different in volume, and the detection efficiency of the KG2 is one-tenth of that of the APLF80+3Pr. Therefore, when a tenfold correction is performed for the signal intensities, the signal intensity ratio becomes approximately 1:30.

Figure 8:
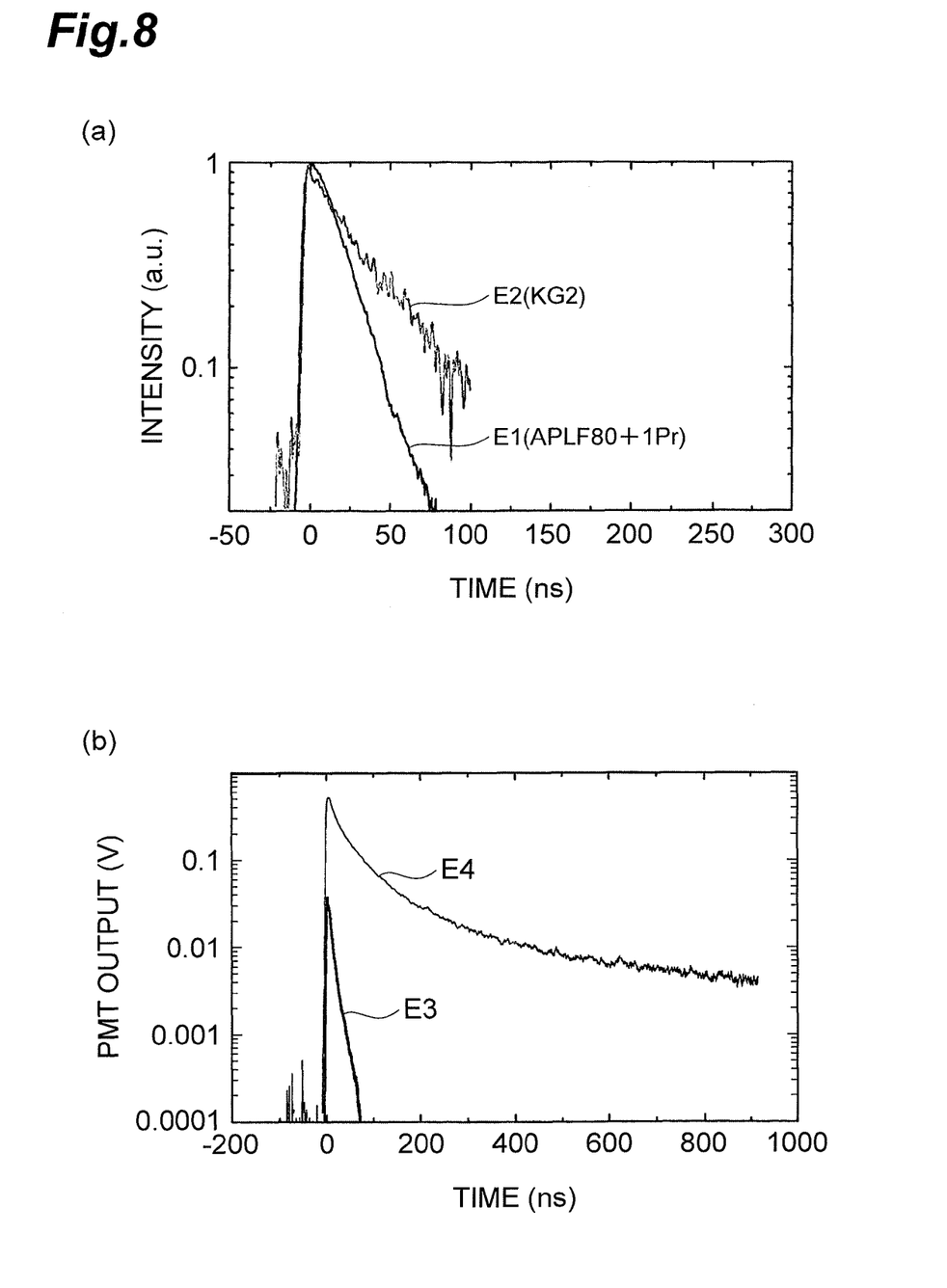
FIG. 8 is a figure including graphs showing temporal waveforms of detection signals obtained by UV light detection and α-ray detection.

FIG. 8 is a figure including graphs showing temporal waveforms of detection signals obtained by UV light detection and α-ray detection. The graph (a) in FIG. 8 shows the detection signal waveforms by UV light detection (photoexcitation), the horizontal axis shows the time (ns), and the vertical axis shows the intensity (a.u.). Further, the graph (b) in FIG. 8 shows detection signal waveforms by α-rays from $^{241}Am$, the horizontal axis shows the time (ns), and the vertical axis shows the PMT output (V). Further, the measured emission intensities are directly shown on the graph (b).

In (a) in FIG. 8, the graph E1 shows the detection signal waveform for UV light when the APLF80+1Pr is used as a scintillator, and the graph E2 shows the detection signal waveform when the KG2 serving as a conventional scintillator is used. On these graphs, a decay time of the signal is 38.8 ns on the graph E2 using the KG2. On the other hand, a decay time of the signal is 19.3 ns on the graph E1 using the APLF80+1Pr, and it is clear that a response speed is improved in the same way as in the case of X-ray detection shown in FIG. 7.

Further, in (b) in FIG. 8, the graph E3 shows the detection signal waveform for α-rays when the APLF80+3Pr is used as a scintillator, and the graph E4 shows the detection signal waveform when the GS2 (manufactured by Saint-Gobain K.K.) serving as a conventional scintillator is used. The emission intensities are directly shown on these graphs E3 and E4 as described above, and it is clear that the emission intensity is made smaller on the graph E3. Further, in the scintillator formed of the new material APLF80+3Pr, its light-emission amount is approximately 300 photons/α at α-rays of 5.5 MeV.

Figure 9:
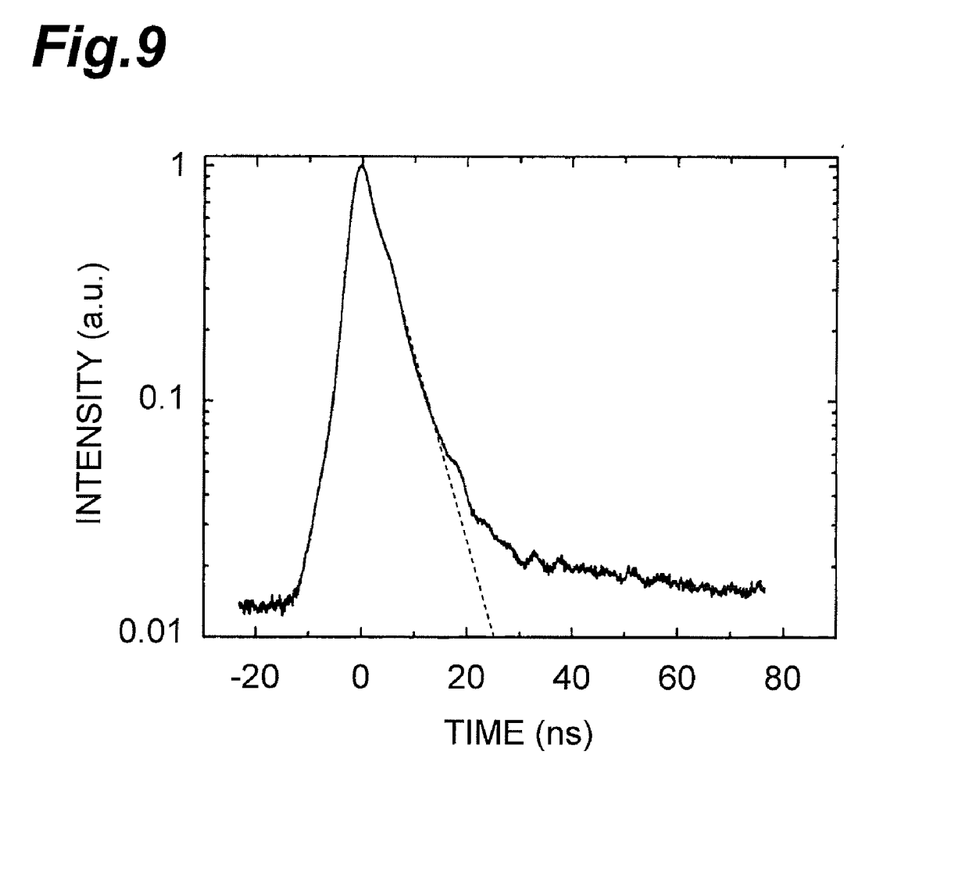
FIG. 9 is a graph showing a temporal waveform of a detection signal obtained by neutron detection.

FIG. 9 is a graph showing a temporal waveform of a detection signal obtained by neutron detection, the horizontal axis shows the time (ns), and the vertical axis shows the intensity (a.u.). In this measurement data, the APLF80+3Pr is used as a scintillator. Further, as neutrons, neutrons emitted from a $^{252}Cf$ standard neutron source are used. In this graph, a decay time of the signal is 5.6 ns, that shows the fast response in neutron detection.

A specific configuration of the neutron measurement apparatus 1A shown in FIG. 3 will be further described along with its configuration example.

Figure 10:
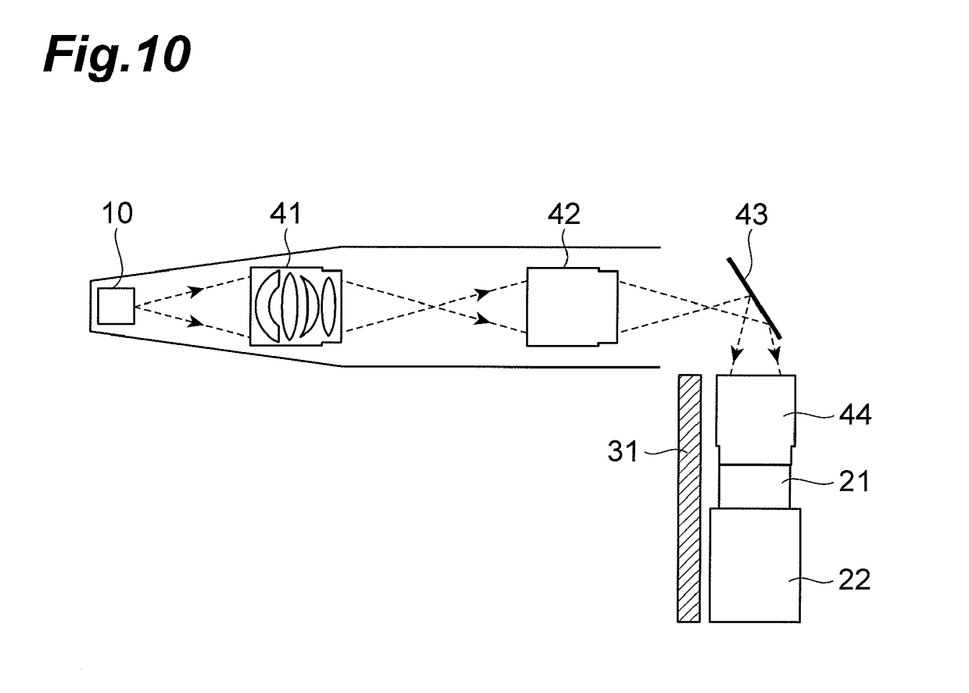
FIG. 10 is a diagram showing an example of a specific configuration of the neutron measurement apparatus.

FIG. 10 is a diagram showing an example of a specific configuration of the neutron measurement apparatus. In the configuration example shown in FIG. 10, as a light guide optical system between the neutron detection unit 10 and the photodetection unit including the image intensifier 21 and the two-dimensional photodetector 22, a lens system 41, a lens system 42, a reflecting mirror 43, and a lens system 44 are provided in the order from the side of the neutron detection unit 10. In this configuration, scintillation light is imaged by the lens systems 41, 42, and 44, and its optical path is changed toward the photodetection unit by the reflecting mirror 43. Further, a shielding member 31 for radiation shielding is provided laterally to the photodetection unit on the neutron detection unit 10 side.

Figure 11:
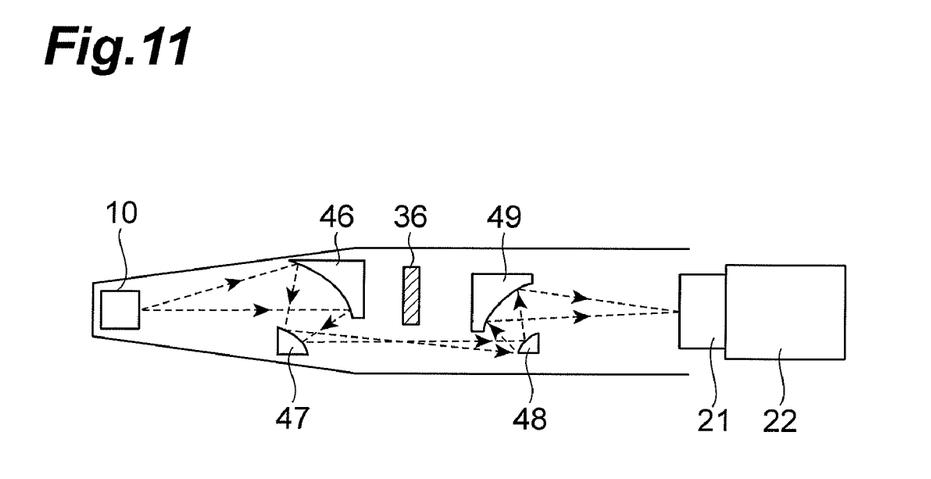
FIG. 11 is a diagram showing another example of a specific configuration of the neutron measurement apparatus.

FIG. 11 is a diagram showing another example of a specific configuration of the neutron measurement apparatus. In the configuration example shown in FIG. 11, as a light guide optical system between the neutron detection unit 10 and the photodetection unit including the image intensifier 21 and the two-dimensional photodetector 22, curved reflecting mirrors 46, 47, 48, and 49 are provided in the order from the side of the neutron detection unit 10. In this configuration, scintillation light is imaged and its optical path is folded back by the curved reflecting mirrors 46, 47, 48, and 49, thereby downsizing the optical system. Further, a shielding member 36 for radiation shielding is provided between the curved reflecting mirrors 46 and 49.

As shown in these configuration examples of FIG. 10 and FIG. 11, specifically, various configurations may be used as a configuration of the neutron measurement apparatus.

The neutron detection scintillator and the neutron measurement apparatus according to the present invention are not limited to the above-described embodiments and configuration examples, and various modifications thereof are possible. For example, with respect to the neutron detection unit, the configuration including the scintillator array having the plurality of scintillator cells is illustrated above, however, a single scintillator cell may be considered as a neutron detection unit. Further, with respect to the photodetection unit as well, in the same way, for example, various configurations such as a configuration using a single zero-dimensional photodetector may be used. Further, with respect to the applications and usages of the neutron detection scintillator and the measurement apparatus, the measurement of neutrons from the implosion plasma is illustrated above, however, the detection properties such as the fast response of the scintillator according to the present invention are not limited to the measurement of neutrons from the implosion plasma, and are generally effective for the measurement of neutrons in various fields.

Here, the neutron detection scintillator according to the above-described embodiment is a scintillator which emits scintillation light in response to incidence of neutrons, and which is formed of a lithium glass material in which $PrF_3$ is doped at a predetermined doping amount to a glass material $20Al(PO_3)_3$-$80LiF$.

In the above-described scintillator, with respect to a doping amount of $PrF_3$ in its glass composition, a doping amount of $PrF_3$ for the glass material $20Al(PO_3)_3$-$80LiF$ is preferably not less than 1% and not more than 3% in mol % ($1\% \leq n\% \leq 3\%$). Thereby, it is possible to suitably realize the above-described neutron detection scintillator with high-speed responsiveness.

The neutron measurement apparatus according to the above-described embodiment includes (1) a neutron detection unit including the above-described neutron detection scintillator, (2) a photodetection unit that detects scintillation light emitted from the neutron detection unit in response to incidence of neutrons of measurement objects, and (3) a light guide optical system that guides the scintillation light from the neutron detection unit to the photodetection unit.

Further, the measurement apparatus preferably includes shielding means which is located between the neutron detection unit and the photodetection unit, the shielding means is for shielding radiation going toward the photodetection unit. Thereby, generation of noise components due to the excess radiation such as X-rays and neutrons from the implosion plasma being incident into the photodetection unit is suppressed, which makes it possible to accurately perform the neutron measurement.

In the above-described neutron measurement apparatus, the neutron detection unit preferably has a scintillator array in which a plurality of scintillator cells formed of the neutron detection scintillator are two-dimensionally arrayed, and the photodetection unit preferably has a two-dimensional photodetector which is configured to be able to detect a two-dimensional optical image by the scintillation light emitted from the scintillator array. In this way, the neutron detection unit is configured such that a plurality of scintillator cells (a plurality of detection channels) are two-dimensionally arrayed, thereby reducing the number of detecting primary neutrons by the scintillator cells per one channel, which makes it possible to facilitate the detection of scattered neutrons.

Further, the photodetection unit preferably has, in addition to the two-dimensional photodetector, an image intensifier which is disposed at the front of the two-dimensional photodetector, the image intensifier intensifies the two-dimensional optical image incident into the two-dimensional photodetector from the scintillator array. With such a configuration, a two-dimensional optical image by scintillation light corresponding to a pattern of detecting neutrons in the neutron detection unit is intensified, to be able to improve the accuracy of detection of an optical image by the two-dimensional photodetector.

Further, when the image intensifier is used in the photodetection unit in this way, it is particularly preferable that the image intensifier has a gate function of limiting a period for detecting the two-dimensional optical image. By utilizing such a gate function of the image intensifier, it is possible to suitably execute selective detection of scattered neutrons with respect to primary neutrons and X-rays.

INDUSTRIAL APPLICABILITY

The present invention can be applied as a neutron detection scintillator and a neutron measurement apparatus which are capable of suitably performing neutron measurement such as measurement of scattered neutrons from an implosion plasma.

REFERENCE SIGNS LIST

1A—neutron measurement apparatus, 10—scintillator array (neutron detection unit), 11—scintillator cell, 15—light guide optical system, 16—condenser lens, 17—reflecting mirror, 20—photodetection unit, 21—image intensifier, 22—two-dimensional photodetector, 30, 31, 36—shielding member, 41, 42, 44—lens system, 43, 46, 47, 48, 49—reflecting mirror.

The invention claimed is:

1. A neutron detection scintillator emitting scintillation light in response to incidence of neutrons, the scintillator is formed of a lithium glass material which is a glass material $20Al(PO_3)_3$-$80LiF$ doped with $PrF_3$ at a predetermined doping amount.

2. The neutron detection scintillator according to claim 1, wherein the doping amount of $PrF_3$ for the glass material $20Al(PO_3)_3$-$80LiF$ is not less than 1% and not more than 3% in mol %.

3. A neutron measurement apparatus comprising:
a neutron detection unit including the neutron detection scintillator according to claim 1;
a photodetection unit detecting scintillation light emitted from the neutron detection unit in response to incidence of neutrons of measurement objects; and a light guide optical system guiding the scintillation light from the neutron detection unit to the photodetection unit.

4. The neutron measurement apparatus according to claim 3, wherein the neutron detection unit has a scintillator array in which a plurality of scintillator cells formed of the neutron detection scintillator are two-dimensionally arrayed, and the photodetection unit has a two-dimensional photodetector which is configured to be able to detect a two-dimensional optical image by the scintillation light emitted from the scintillator array.

5. The neutron measurement apparatus according to claim 4, wherein the photodetection unit has an image intensifier which is disposed at the front of the two-dimensional photodetector, the image intensifier intensifies the two-dimensional optical image incident into the two-dimensional photodetector from the scintillator array.

6. The neutron measurement apparatus according to claim 5, wherein the image intensifier has a gate function of limiting a period for detecting the two-dimensional optical image.

7. The neutron measurement apparatus according to claim 3, comprising shielding means which is located between the neutron detection unit and the photodetection unit, the shielding means is for shielding radiation passing in a direction toward the photodetection unit.

* * * * *

UNITED STATES PATENT AND TRADEMARK OFFICE
CERTIFICATE OF CORRECTION

PATENT NO. : 8,405,034 B2
APPLICATION NO. : 13/266189
DATED : March 26, 2013
INVENTOR(S) : Hiroshi Azechi et al.

It is certified that error appears in the above-identified patent and that said Letters Patent is hereby corrected as shown below:

On the Title page in Item (73) "Assignees" of the above-identified patent, add --TOKUYAMA CORPORATION, Shunan-shi, Yamaguchi (JP); FURUKAWA CO., LTD., Tokyo (JP); NAGASAKI PREFECTURAL GOVERNMENT, Nagasaki-shi, Nagasaki (JP); HAMAMATSU PHOTONICS K.K., Hamamatsu-shi, Shizuoka (JP)--

Signed and Sealed this
Eighteenth Day of June, 2013

Teresa Stanek Rea
*Acting Director of the United States Patent and Trademark Office*